No. 861,366. PATENTED JULY 30, 1907.
F. G. JAHN.
CLUTCH MECHANISM.
APPLICATION FILED FEB. 17, 1905.

Witnesses:
M E Hurd
B Curtis

Inventor.
Frederick G. Jahn
by Geo. H. Graham
Atty.

UNITED STATES PATENT OFFICE.

FREDERICK G. JAHN, OF NEW YORK, N. Y., ASSIGNOR TO THE INTERNATIONAL POSTAL SUPPLY COMPANY OF NEW YORK, OF BROOKLYN, NEW YORK, A CORPORATION OF NEW YORK.

CLUTCH MECHANISM.

No. 861,366.     Specification of Letters Patent.     Patented July 30, 1907.

Application filed February 17, 1905. Serial No. 246,149.

*To all whom it may concern:*

Be it known that I, FREDERICK G. JAHN, a citizen of the United States, residing at the borough of Brooklyn, city and State of New York, have invented certain new and useful Improvements in Clutch Mechanism, of which the following is a specification.

This invention relates generally to clutch driving mechanism and more particularly to that class wherein the clutch is adapted for intermittent driving action. And it has for its object to provide a simple and effective mechanism by which the wear of the parts is reduced to the minimum, is self contained and easy of manufacture and assemblage.

It also has for its object to provide means by which the stop and start of the clutch may be effected with ease and certainty.

Figure 1:
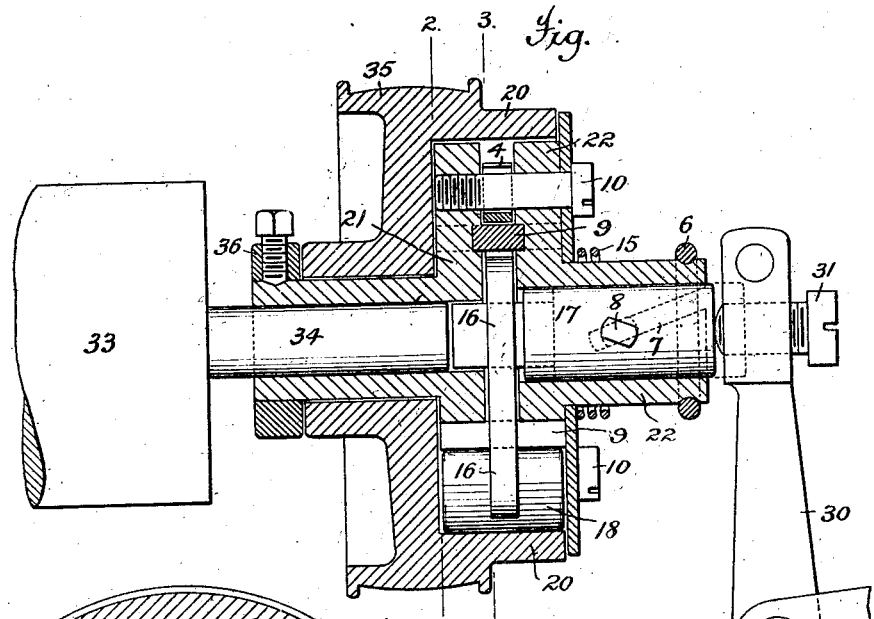
Figure 2:
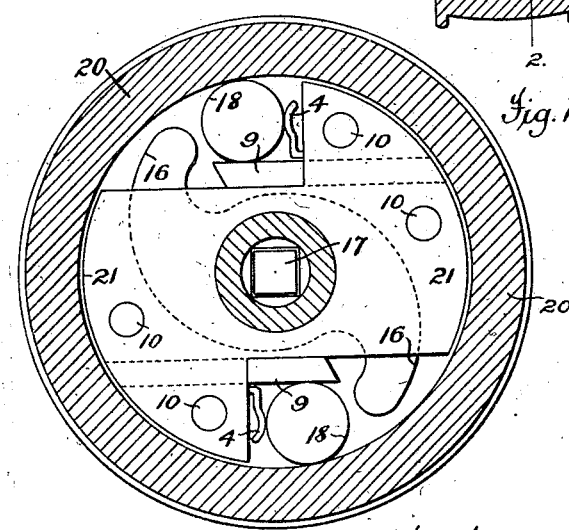
Figure 3:
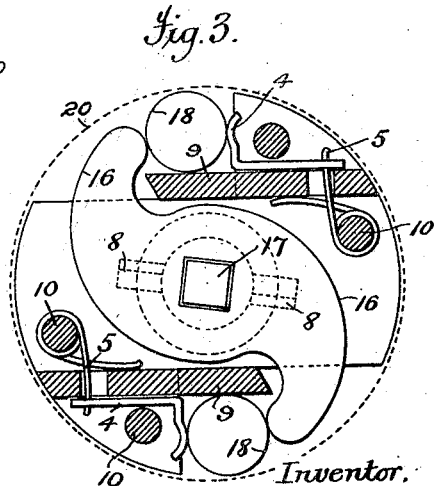
Figure 4:
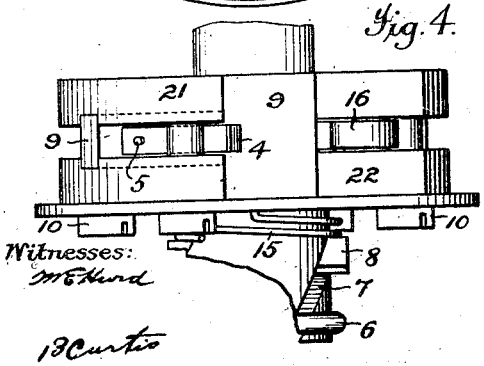

As a better understanding of the invention will be had from a detailed description thereof, such description will now be given, reference being made to the accompanying drawings, in which:

Figure 1, is a longitudinal sectional elevation. Fig. 2, is a cross section of the same on the line 2, 2, of Fig. 1, showing the driving and driven members clutched. Fig. 3, is a like section on the line 3, 3, the clutch shell being omitted and indicated by dotted lines, the parts being in their unclutched positions. Fig. 4, is an elevation of the major portion of the mechanism with the clutch shell and rolls removed.

The improved clutch driving mechanism consists of a clutch shell 20 and a hub 21 with one or more clutch rolls 18 interposed between the two, and means such as a rock arm or disengager 16 for moving said rolls out of clutching position whenever the driven part is to rest.

The unclutching of the clutch rolls or their movement into unclutching position may be controlled as illustrated by an independently mounted lever or arm 30.

For convenience in manufacture and assembling the hub 21 is made in two parts, the outer part 22 separated from the other part by distance pieces 9, fitting grooves in the contiguous faces of said parts and held together by screws 10. The distance pieces also provide diametrically opposed and tangentially arranged hardened bearing faces for the hub against which the clutch rolls bear; and the space between the two parts of the hub is conveniently occupied by the disengaging rock arm 16 with its opposite ends arranged to meet the rolls 18, when moving them to unclutch the hub from the clutch shell. The center of the disengaging rock arm 16 has a polygonal shaped opening slidingly mounted on or engaged by the similarly shaped end of a key or plunger 17 that is axially mounted in bearings in the part 22 of the clutch hub and adapted to move therein both longitudinally and rotatively when operating to move the disengaging arm.

The key or plunger 17 has an oppositely projecting cross pin 8 which takes into inclined slots 7, in the opposite walls of the hub so that when the key is moved longitudinally in its bearings in the hub it will be caused to partake of a slight rotation or twisting movement and thereby turn the disengaging arm 16 into or out of contact with the clutch rolls 18. In other words the bearing for the plunger forms a nut which, when the plunger is moved longitudinally thereof acts to turn or rotate said plunger.

The movement of the disengaging arm 16 to unclutch the clutch rolls is had against the pressure of a suitable spring 15, which in this instance is coiled about the projecting end of the hub of the part 22 and bears against the cross pin of the key or plunger 8, holding the cross pin to one end of the inclined slots and operating to return said plunger to its normal out of action position after each unclutching movement. A split or other ring 6, around the end of the projecting hub of the part 22 forms a stop for the cross pin 8 preventing the accidental displacement of the plunger. The key or plunger 17 for moving or turning the disengaging arm 16 is operated by the independently mounted lever or arm 30 having an end formed by an adjustable stop screw 31 for contact with the plunger, which lever may be moved by hand or otherwise.

Each of the clutch rolls 18 may be insured moving into clutching position against the exterior shell upon the release of the disengaging arm by a spring 5 acting in this instance indirectly against a clutch roll by an interposed slidable bearer 4, that is guided by the exterior face of the distance piece 9 and the shank of one of the hub screws 10 and having a portion bearing against the rear of the clutch roll.

When the clutch rolls 18 have been moved from clutching position, it follows that the clutch shell 20 may rotate independent of the hub 21 and the clutch rolls 18, and it also follows as a consequence thereof that the hub and clutch rolls may rotate irrespective of the clutch shell.

As an illustration of a useful application of the improved clutch, the mechanism is arranged to drive a roller 33 fast to a shaft 34 to which the hub 21 of the clutch is also secured. The clutch shell 20 forms part of a driving pulley 35, the hub of which is mounted loosely on the underlying sleeve of the hub which is secured to the shaft and carries a collar 36 holding the pulley and clutch shell in longitudinal position with respect to the clutch hub.

What is claimed is:

1. In a clutch, the combination of the driving and driven members, the driven member having a central bore, an interposed engaging piece therefor and a disengaging device extending radially from the axis of said central bore for controlling the position of said piece.

2. In a clutch, the combination of a rotating driving member, a driven member having a central bore, interposed loosely mounted engaging pieces, a disengaging arm therefor extending radially from the axis of said central bore and means external of said two members for moving the disengaging arm.

3. In a clutch, the combination of rotating driving member, a driven member having a central bore, interposed loosely mounted engaging pieces, a disengaging arm therefor extending radially from the axis of said central bore and mounted to turn independent of the driven member and means external of said two members for moving the disengaging arm.

4. In a clutch, the combination of rotating driving member, a driven member having a central bore, interposed loosely mounted engaging pieces, a disengaging arm therefor extending radially from the axis of said central bore and an axial externally projecting piece carried by the driven member for moving said arm.

5. In a clutch, the combination of a rotating driving member, a driven member having a central bore, interposed loosely mounted engaging pieces, a disengaging arm therefor extending radially from the axis of said central bore, an independently mounted arm and connections between said arm and the disengaging arm for controlling the action of said disengaging arm.

6. The combination of the rotating driving clutch shell, the driven hub having a central bore, clutch rolls interposed between the two, a disengaging arm extending radially from the axis of the central bore of the hub for moving said rolls out of clutching position and means external of the shell and hub for controlling the movement of the disengaging arm.

7. The combination of the rotating clutch shell, the driven hub having a central bore, clutch rolls interposed between the two, a disengaging rock arm axially mounted in the central bore of the hub for moving said rolls out of clutching position and externally mounted means for operating said rock arm.

8. The combination of the rotating clutch shell, the driven hub, clutch rolls interposed between the two, a disengaging rock arm for moving said rolls out of clutching position, a plunger axially mounted in the hub and engaging said rock arm and external means for moving the plunger.

9. The combination of the rotating clutch shell, the driven hub, clutch rolls interposed between the two, a disengaging arm for moving said rolls out of clutching position, a plunger for moving said arm axially mounted in and movable with respect to the hub and external means for moving said plunger.

10. The combination of the rotating clutch shell, a driven hub, clutch rolls interposed between the two, a disengaging arm for the rolls, a key engaging said arm and mounted in the hub to turn with respect thereto and externally mounted means for moving the key.

11. The combination of the rotating clutch shell, a driven hub formed of two united parts, distance pieces between the two hub-forming parts and providing bearing faces for the hub, interposed clutch rolls between said hub bearing faces and the shell, a disengaging arm for the rolls mounted in the space between the two hub-forming parts and external means for moving the disengaging arm.

12. The combination of the rotating clutch shell, a driven hub formed of two united parts, distance pieces between the two hub-forming parts and providing bearing faces for the hub, interposed clutch rolls between said hub bearing faces and the shell, a disengaging arm for the rolls mounted in the space between the two hub-forming parts and an externally projecting piece carried by the hub for moving said arm.

13. The combination of the rotating clutch shell, the driven hub formed of two united parts, distance pieces between the two hub-forming parts and providing bearing faces for the hub, interposed clutch rolls between the hub bearing faces and the shell, a disengaging arm for the rolls mounted in the space between the two hub-forming parts and an externally projecting plunger mounted axially in the hub and adapted to move independently thereof.

14. The combination of the rotating clutch shell, the driven hub having tangential bearing faces and provided with a central bore, clutch rolls interposed between the hub bearing faces and the shell, springs holding the rolls in clutching position and a disengaging arm extending radially from the axis of the central bore of the hub for moving the rolls out of said position.

15. The combination of the rotating clutch shell, the driven hub, clutch rolls interposed between the hub and shell, spring pressed and independently mounted bearing pieces carried by the hub acting to move the rolls into clutching position and externally operated disengaging arm for moving the rolls out of said position.

In testimony whereof, I have signed my name to this specification in the presence of two subscribing witnesses, this 14th day of February, 1905.

FREDERICK G. JAHN.

Witnesses:
GEO. H. GRAHAM,
A. T. DOLPHIN.